PROCESS FOR PRODUCING OMEGA-LAUROLACTAM

Toshiro Hirose and Takashi Matsubara, Nagoya, Japan, assignors to Toagosei Chemical Industry Co., Ltd., Minato-ku, Tokyo, Japan
No Drawing. Filed Jan. 11, 1971, Ser. No. 105,669
Claims priority, application Japan, Jan. 19, 1970, 45/4,406
Int. Cl. C07d 41/00
U.S. Cl. 260—239.3 A
4 Claims

ABSTRACT OF THE DISCLOSURE

A high purity ω-laurolactam is prepared from a crude cyclododecanone oxime containing 5% by weight or less of cyclododecanone by subjecting the oxime to the Beckmann rearrangement reaction in the presence of sulfuric acid having a concentration of 98% by weight or more or fuming sulfuric acid containing 20% by weight or less of sulfuric-anhydride, separating the thus formed ω-laurolactam from the reaction mixture, dissolving the resulting ω-laurolactam in a liquid aromatic hydrocarbon, washing the solution with an alkali solution at a temperature of 60° to 120° C., and recovering ω-laurolactam.

---

The present invention relates to a process for producing extremely pure ω-laurolactam.

ω-Laurolactam is an important industrial chemical as the starting material for polyamides. However, for synthesizing ω-laurolactam of an industrial value, an extremely pure lactam is required. ω-Laurolactam becomes very unstable if an impurity is present even in extremely small amount, and tends to discolor or degenerate not only during polymerization but also during storage. On the other hand, under more severe purifying conditions ω-laurolactam tends to degenerate or polymerize during purification, resulting in a loss of the product.

An object of the present invention is to provide a process for producing highly purified ω-laurolactam by an inexpensive procedure with diminished loss of the lactam.

There have been known, heretofore, a number of purification methods with regard to lactams. For example, for the purification of ε-caprolactam there have been known several methods such as recrystallization from various solvents, treatment with an ion-exchanger, treatment with hydrogen in the presence of a hydrogenation catalyst, treatment with potassium permanganate, treatment with a reducing agent, extraction, contact with an adsorbent, disillation after addition of a peroxide, etc.

However, each of these methods has a disadvantage such as an insufficient degree of purification, a high purification cost, etc. Moreover, since ω-laurolactam has different properties from those of ε-caprolactam, every above-said method is not always independently applicable to ω-laurolactam. For instance, ε-caprolactam has a high solubility in water, i.e., 800 to 900 mg./cc., whereas ω-laurolactam has a solubility of only 0.6 mg./cc. under the same conditions.

With regard to the purification of 5-laurolactam, also, a number of methods have been known. There have been proposed methods such as, for example, treatment with an alkali metal hydroxide at a temperature higher than 160° C. (Japanese patent publication No. 21,734/69), treatment with a powdered metal or a metal oxide (U.S. Pat. No. 3,154,540), extraction (Dutch Pat. No. 6,413,634), recrystallization (Japanese Pat. publication Nos. 3,614/66 and 81/62; Ind. Eng. Chem., 53, 826), hydrogenation (French Pat. No. 1,332,193), treatment with a solid adsorbent (Japanese Pat. publication No. 22,379/66), etc. However, each of these methods has its own defect such as an operational difficulty on industrial scale, a specific applicability to lactams produced by selected processes, or a high cost.

As a result of extensive researches in the process for purifying ω-laurolactam synthesized by the Beckmann rearrangement from cyclododecanone oxime which was obtained through cyclododecanone, the present inventors found that the presence of cyclododecanone in cyclododecanone oxime has a great influence upon the quality of ω-laurolactam. The present inventors have found an entirely novel fact that the presence of cyclododecanone not only brings about loss of the material through condensation, decomposition, and degeneration but also, when it amounts above 5% by weight, has an adverse effect upon the quality of ω-laurolactam obtained by the Beckmann rearrangement. Based on the finding it has been further found that pure ω-laurolactam may be obtained in a high yield by effecting Beckmann rearrangement reaction under specific conditions using specific starting material, as disclosed hereunder, and then subjecting the resulting product to a simple treatment, as mentioned hereunder. Based on these findings, the present invention has been accomplished. That is, the present invention provides a process for producing highly purified ω-laurolactam, which comprises the following steps:

(1) Cyclododecanone oxime containing 5% by weight of less of cyclododecanone and sulfuric acid of a concentration of 98% or more or fuming sulfuric acid containing 20% or less of sulfuric anhydride ($SO_3$) are made to react in the Beckmann rearrangement step.

(2) After being neutralized or without being neutralized with an alkali, the resulting lactam is dissolved in or extracted with (hereinafter simply referred to as "dissolved" for the sake of brevity) with an aromatic hydrocarbon or an organic solvent containing an aromatic hydrocarbon.

(3) The organic layer obtained in the preceding step is washed with an alkali or an aqueous alkali solution (hereinafter simply referred to as "wash with alkali") at a temperature of 60° to 120° C.

(4) The organic layer obtained after washing with alkali in the preceding step is distilled to yield ω-laurolactam.

Each of the above-said steps is further illustrated below in detail.

The reasons for limiting the content of cyclododecanone in cyclododecanone oxime for feed to the Beckmann rearrangement step are as follows: When cyclododecanone is present in cyclododecanone oxime in an amount exceeding 5% a high quality lactam is difficult to obtain, and in order to obtain ω-laurolactam of sufficient quality for producing a polyamide of industrial value, a further expensive purification becomes necessary; and if the sulfuric acid used in the Beckmann rearrangement step is intended to be recovered by neutralization as an alkali metal sulfate, e.g. ammonium sulfate or sodium sulfate, the quality of the recovered alkali metal sulfate is unsatisfactory for the profitable utilization thereof. The content of cyclododecanone in cyclododecanone oxime can be reduced to less than 5% by increasing the conversion of cyclododecanone in the reaction with hydroxylamine, or by decreasing the concentration of cyclododecanone in cyclododecanone oxime obtained at a low conversion by means of recrystallization, extraction, etc.

The concentration of sulfuric acid to be fed to the Beckmann rearrangement step is also an important factor. When sulfuric acid of a concentration of less than 98% is used, there occur side reactions, of which hydrolysis is dominant, and the resulting ω-laurolactam is difficult to purify. When fuming sulfuric acid containing more than 20% of free sulfuric anhydride is used, there occurs a decrease in the yield of the lactam.

Other conditions for the Beckmann rearrangement are not critical. The reaction temperature is 70° to 140° C., and the molar ratio of sulfuric acid to cyclododecanone oxime for feed is preferably 2.0 to 5.0. The Beckmann rearrangement reaction is effected preferably in such a manner that the oxime is dissolved in a solvent such as carbon tetrachloride, cyclohexane, chloroform, methylene chloride, or the like, and under the predetermined conditions of reaction the solvent is allowed to evaporate to balance the heat of reaction with the heat of vaporization.

The viscous reaction liquid, brownish black in color, obtained by the Beckmann rearrangement from cyclododecanone oxime is a solution of the lactam in sulfuric acid. For treating said reaction liquid there has heretofore been known a method, in which the reaction liquid is immediately poured into an aqueous solution of an alkali such as ammonia, sodium hydroxide, potassium hydroxide, sodium carbonate, potassium carbonate, or the like, to hydrolyze and neutralize at the same time and to separate ω-laurolactam as crystals. There has been known another method, in which the reaction liquid is diluted with water until the concentration of sulfuric acid in the water layer becomes 10 to 60% to separate ω-laurolactam as crystals. In some cases, the reaction liquid is treated according to the latter method, and then further neutralized with an alkali.

In the present process, ω-laurolactam contained in the solution which is obtained by the Beckmann rearrangement, is, after being separated as a solid by treatment in the above-said manner, or without undergoing such a treatment, dissolved in an aromatic hydrocarbon or in an organic solvent containing an aromatic hydrocarbon. This dissolving is followed by washing with an alkali to effectively recover and purify ω-laurolactam.

Among aromatic hydrocarbons to be used for dissolving (or extracting) ω-laurolactam, benzene, toluene, xylene, ethylbenzene, cumene, etc., are preferred, but other aromatic hyldrocarbons are not excluded. These aromatic hydrocarbons are used each alone or in combinations of two or more members. They are also used in admixture with other solvents including halohydrocarbons such as carbon tetrachloride, chloroform, and dichloroethane, cycloaliphatic hydrocarbons such as cyclohexane; aliphatic hydrocarbons such as n-hexane and n-heptane, etc. The amount of an aromatic hydrocarbon in said mixture with an organic solvent is not critical, but is, in general, preferably more than 20%. When said amount is too small, pure ω-laurolactam is, in some cases, difficult to obtain.

The temperature, at which the lactam is dissolved in an aromatic hydrocarbon or an organic solvent containing an aromatic hydrocarbon, is not critical, but is preferably 50° to 100° C. The extract layer (organic layer), which contains mainly ω-laurolactam, is yellow or yellowish brown in color, whereas the raffinate (water layer) is dark reddish brown in color. The greater part of impurities move into the water layer.

In the present process, the above-said yellow or yellowish brown organic layer is washed with an alkali at 60° to 120° C. By this treatment the organic layer turns nearly colorless and becomes transparent. This is a surprising fact found by the present inventors, which has resulted from the effective combination of the Beckmann rearrangement and the purification procedure. The alkalis for use in the alkali washing include hydroxide of alkali metals, such as sodium hydroxide and potassium hydroxide; carbonate of alkali metals, such as sodium carbonate and potassium carbonate; and ammonia. These compounds are used as 0.1 to 50% aqueous solutions. When the alkali treatment is conducted at a temperature lower than 60° C., a satisfactory degree of purification is difficult to attain and the concentration of ω-laurolactam in the organic layer also becomes low. On the other hand, when the alkali treatment is conducted at temperatures higher than 120° C. hydrolysis of the lactam takes place acceleratingly, to decrease the yield of lactam. Therefore, in the present invention the organic layer should be contacted with the aqueous alkali solution at a temperature of 60° to 120° C. In said temperature range an extremely enhanced effect of the alkali washing may be displayed and the greater part of discoloring impurities move into the aqueous alkali solution layer.

The alkali treatment may be conducted continuously by contacting the organic layer countercurrently with the alkali solution, or batchwise by mixing, standing, and then separating the two layers from each other. Each method can be used according to the circumstances. Before being treated with an alkali, the organic layer may be treated with other agents such as water or an aqueous solution containing 0.1 to 20% of an inorganic acid. It is also possible that the organic layer is treated with water after the alkali treatment.

The organic layer thus treated contains very few impurities beside the unreacted cyclododecanone, and is a transparent liquid slightly yellowish in color.

Distillation of the solvent is conducted under atmospheric pressure or reduced pressure, and then distillation of cyclododecanone and ω-laurolactam is conducted preferably under reduced pressure at temperatures below 250° C. in the presence of an inert gas, because ω-laurolactam is unstable to heat and air. ω-Laurolactam obtained is a snow-white solid which can be polymerized to yield a white polyamide.

As mentioned above the present process is capable of giving highly purified ω-laurolactam in high yields, and hence, is an extremely useful process from the industrial point of view.

According to the study of the present inventors, the distillation of the solvent is carried out extremely advantageously in cases where toluene is used as the solvent, by the following method. That is, the method is to distil toluene while maintaining the pressure of distillation column at the portion of supplying feed stock under 350 to 600 mm. Hg (abs.) inclusive, and preferably 400 to 500 mm. Hg (abs.). This method is particularly effective for applying to a toluene solution containing 1 to 50% by weight of ω-laurolactam. Toluene can be recovered very effectively under the condition without causing the clogging of the distillation column due to the crystallizing of the lactam and the lowering of the yield due to the polymerization of the lactam.

The invention is further illustrated below in detail with reference to examples and comparative examples. The results obtained in each of the examples are summarized in Table 1. The quality evaluation of the ω-laurolactam obtained was performed as follows:

0.4 gram of 70% arthophosphoric acid was added to 20 g. of ω-laurolactam, and the mixture was allowed to polymerize at 295° C. for 4 hours in a sealed tube containing nitrogen. The color of the polymer and the relative viscosity thereof were determined to evaluate the quality of polymer.

The color of the polymer was compared with the standard color of the solution of potassium chloroplatinate and cobalt chloride in hydrochloric acid-water (Hazen number, JIS K-4172). The smaller is the Hazen number, the less is the discoloration, and hence the quality is better.

The relative viscosity in m-cresol was measured by means of an Ubbelohde viscosimeter at 25° C. on the solution of 0.1 g. of the polymer, which had been extracted with hot methanol and then dried, in 25 cc. of m-cresol.

EXAMPLE 1

740 grams per hour of a carbon tetrachloride solution containing 8% (by weight; the same shall apply hereinafter) of cyclododecanone oxime, which contained 2% of cyclododecanone [i.e. 59 g. (0.3 mole) of cyclododecanone oxime per hour], and 98 g./hr. (1 mole/hr.) of 100% sulfuric acid were continuously fed to a reactor equipped with a stirrer and an outlet for distilled carbon tetrachloride. The reaction temperature was maintained at 105±3° C., and the residence time was adjusted to 60 minutes. The rearrangement reaction of cyclododecanone oxime was allowed to proceed while continuously distilling the carbon tetrachloride. The dark reddish brown reaction liquid was poured into cold water to dilute the sulfuric acid to a concentration of 30% and to precipitate ω-laurolactam as a solid. After neutralization with 28% ammonia, the precipitated crystals were collected by filtration. 300 grams of the solid obtained was dissolved in 2,000 cc. of toluene.

The yellowish brown toluene solution was mixed with 500 cc. of 3% aqueous sodium hydroxide solution at a temperature of 80° C., shaked, and then left standing to separate into two layers. The greater part of discoloring impurities moved to the aqueous layer, and the organic layer became nearly colorless and transparent. After being washed twice with 500 cc. of water, the toluene was removed by evaporation, and then rectification of ω-laurolactam was carried out under reduced pressure and nitrogen atmosphere to obtain 143 g. of purified ω-laurolactam melting at 151.5°–152.5° C. The yield corresponded to 96% based on cyclododecanone oxime. The pure ω-laurolactam obtained was polymerized in the above-mentioned manner to obtain a white polymer having a Hazen number of 60–80 and a relative viscosity of 1.74.

EXAMPLE 2

1180 grams per hour of a cyclohexane solution containing 5% of cyclododecanone oxime, which contained 0.5% of cyclododecanone [i.e. 59 g. (0.3 mole) of cyclododecanone oxime per hour], and 88 g./hr. (0.9 mole/hr.) of fuming sulfuric acid containing 3% of free $SO_3$ were continuously fed to the same reactor as in Example 1. Under the conditions of a reaction temperature of 100±2° C. and a residence time of 60 minutes, the Beckmann rearrangement of cyclododecanone oxime was carried out at atmospheric pressure while continuously evaporating the cyclohexane. The overflowing lactam-sulfuric acid solution was continuously fed to a neutralization-extraction tank (maintained at 80° C.) equipped with a stirrer and a cooler. To the tank were simultaneously fed 740 g./hr. of xylene, 50 l./hr. of gaseous ammonia, and 120 g./hr. of water to effect neutralization and extraction at the same time. The reaction liquid was left standing to separate into two layers, and the organic layer was successively washed with 100 cc. of 1% aqueous sulfuric acid, 100 cc. of 1% aqueous ammonia, and 100 cc. of water. Each washing was carried out at 70° to 80° C. The organic layer turned nearly colorless and transparent. After evaporation of the xylene, ω-laurolactam was rectified to obtain 56 g./hr. of purified ω-laurolactam melting at 151.5° to 152.5° C. The yield corresponded to 95% based on the cyclododecanone oxime used as the starting material.

The purified ω-laurolactam obtained was polymerized in the above-mentioned manner to yield a white polymer having a Hazen number of 60–80 and a relative viscosity of 1.69.

COMPARATIVE EXAMPLES 1–4

Example 1 was repeated except that cyclododecanone oxime containing 10% of cyclododecanone was used in Comparative Example 1; in place of 100% sulfuric acid, 94% sulfuric acid was used in Comparative Example 2; fuming sulfuric acid containing 30% of free $SO_3$ was used in Comparative Example 3; in place of toluene, chloroform was used in Comparative Example 4. The results obtained were as shown in Table 1.

EXAMPLE 3 AND COMPARATIVE EXAMPLES 5–6

Example 2 was repeated except for the change in temperatures of alkali treatment. The results obtained were as shown in Table 1.

The results obtained in Comparative Example 5 show a high Hazen number, which means a high discoloration. The results in Comparative Example 6 show a low yield and a low relative viscosity.

TABLE 1

| | Percent by weight | | | | Temperature of alkali treatment after extraction, °C. | Yield of ω-laurolactam based on oxime, percent by weight | Quality evaluation | |
|---|---|---|---|---|---|---|---|---|
| Example No. | Content of cyclododecanone | Concentration of sulfuric acid | Concentration of $SO_3$ in fuming sulfuric acid | Organic solvent for extraction | | | Hazen No. | Relative viscosity |
| Example: | | | | | | | | |
| 1 | 2 | 100 | | Toluene | 80 | 96.0 | 60–80 | 1.74 |
| 2 | 0.5 | | 3 | Xylene | 70–80 | 95.0 | 60–80 | 1.69 |
| Comparative Example: | | | | | | | | |
| 1 | 10 | 100 | | Toluene | 80 | 91.0 | 120–140 | 1.68 |
| 2 | 2 | 94 | | do | 80 | 92.0 | 200–250 | 1.71 |
| 3 | 2 | | 30 | do | 80 | 72.5 | 40–60 | 1.49 |
| 4 | 2 | 100 | | Chloroform | 80 | 95.0 | 160–180 | 1.69 |
| Example 3 | 0.5 | | 3 | Xylene | 100 | 95.0 | 40–60 | 1.72 |
| Comparative Example: | | | | | | | | |
| 5 | 0.5 | | 3 | do | 150 | 95.0 | 120–140 | 1.71 |
| 6 | 0.5 | | 3 | do | 140 | 85.2 | 60–80 | 1.49 |

What is claimed is:

1. A process for producing ω-laurolactam, which comprises subjecting cyclododecanone oxime containing 5% by weight or less of cyclododecanone to the Beckmann rearrangement reaction in the presence of sulfuric acid of a concentration of 98% by weight or more or fuming sulfuric acid containing 20% by weight or less of sulfuric anhydride, dissolving the resulting ω-laurolactam in toluene, xylene or a mixture thereof, washing the solution with an alkali at a temperature of 60° to 120° C., and subjecting the washed solution to distillation to remove solvent and to rectification to obtain ω-laurolactam.

2. A process according to claim 1, wherein the dissolution is effected at a temperature of 50° to 100° C.

3. A process according to claim 1, wherein the washing is effected by an aqueous solution of an alkali selected from sodium hydroxide, potassium hydroxide, sodium carbonate, potassium carbonate, and ammonia.

4. A process according to claim 3, wherein the aqueous solution contains 0.1 to 50% of the alkali.

References Cited
UNITED STATES PATENTS

| | | | |
|---|---|---|---|
| 3,145,198 | 8/1964 | Morbidelli et al. | 260—239.3 A |
| 2,692,878 | 10/1954 | Kahr | 260—239.3 A |
| 2,758,991 | 8/1956 | Kretzers et al. | 260—239.3 A |
| 2,883,377 | 4/1959 | Von Schickh et al. | 260—239.3 A |
| 3,060,173 | 10/1962 | Von Schickh et al. | 260—239.3 A |
| 3,431,255 | 3/1969 | Strauss et al. | 260—239.3 A |

HENRY R. JILES, Primary Examiner

R. T. BOND, Assistant Examiner